(12) United States Patent
Steiner

(10) Patent No.: US 6,509,982 B2
(45) Date of Patent: *Jan. 21, 2003

(54) HOLOGRAPHIC DIFFUSERS

(75) Inventor: Ivan B. Steiner, Ridgewood, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/041,425

(22) Filed: Jan. 8, 2002

(65) Prior Publication Data

US 2002/0063914 A1 May 30, 2002

Related U.S. Application Data

(63) Continuation-in-part of application No. 09/741,559, filed on Dec. 20, 2000, now Pat. No. 6,421,148
(60) Provisional application No. 60/175,001, filed on Jan. 7, 2000.

(51) Int. Cl.[7] .................................................. G02B 5/32
(52) U.S. Cl. ............................. 359/15; 359/13; 349/112
(58) Field of Search ............................. 359/13, 14, 15; 349/112

(56) References Cited

U.S. PATENT DOCUMENTS 5,280,371 A    1/1994  McCartney, Jr. et al. ...... 359/40
5,521,724 A  * 5/1996  Shires .......................... 359/22
5,850,300 A  * 12/1998 Kathman et al. .............. 359/9

FOREIGN PATENT DOCUMENTS

| EP | 0 479 490 A2 | 4/1992 | ............ G02B/5/32 |
| EP | 0 653 651 A  | 5/1995 | ............ G02B/5/32 |
| GB | 2 306 229 A  | 4/1997 | ......... G02F/1/1335 |

* cited by examiner

Primary Examiner—Cassandra Spyrou
Assistant Examiner—Fayez Assaf

(57) ABSTRACT

A collimated or partially collimated light beam is sent through a substrate matrix of a plurality of nested individual joined geometrically shaped cells wherein each of the cells contains a patterned holographic diffuser or binary optic sheet which produces a transmitted diffused light beam from each of the cells and then superimposes each transmitted diffused light beams from each of the cells to produce a combined resultant diffused light beam. The geometrically shaped cells are clustered in a contiguous arrangement of nested cell subgroups, which are themselves geometrically shaped. When graphed, an angular luminance distribution profile curve with sharply vertical profile slopes at halfpeak points and with a substantially flat and wide peak is resultant which produces a uniform resultant luminance over a wide range of view with a predetermined beam spread and beam deflection angle in relation to a predetermined location of view of the combined resultant diffused light beam.

30 Claims, 10 Drawing Sheets

HOLOGRAPHIC DIFFUSERS

CROSS-REFERENCE TO RELATED APPLICATIONS

This application is a continuation-in-part of application Ser. No. 09/741,559, filed Dec. 20, 2000, now allowed, U.S. Pat. No. 6,421,148 B2 and also incorporates herein Provisional Application No. 60/175,001, filed Jan. 7, 2000.

FEDERALLY SPONSORED RESEARCH OR DEVELOPMENT

Not Applicable

BACKGROUND OF THE INVENTION

1. Technical Field

This invention relates generally to holographic diffusers and more specifically to surface holographic diffusers.

2. Background Art

Holographic diffusers of the reflective or transmissive type are well known in the art. Additionally, LCD displays, projection displays, illumination systems, irradiation systems that operate outside of the visible region, beam scanning systems, and other light distribution devices, which can make use of holographic diffusers, and which can be designed to operate for narrow or wide wavelength band monochrome or for color applications, are also well known in the art. For example, an LCD display typically uses a holographic diffuser either to augment the back lighting of the LCD display or to direct the transmitted display light to an observer located within a particular range of viewing angles. To accomplish this the holographic diffuser directs the diffused light in particular paths of propagation designed to fill a specific range of viewing angles.

For example, if an aircraft cockpit display has a holographic diffuser, the head box of the pilot will be the volume that could be occupied by the pilot's eyes from which the pilot can be expected to view the output of the display. Therefore it is advantageous to design the holographic diffuser to direct the light transmitted by the LCD display to the head box of the pilot. Thus, it is known to redirect light using holographic diffusers.

However, it is difficult to maintain uniform luminance over the range of viewing angles that fill the entire volume of the pilot's head box and to produce a sharp luminance fall-off at the edges of the viewing angle range. This difficulty exists because each holographic diffuser design causes display luminance to be a variable function of viewing angle. As a result, display luminance can vary detrimentally when viewed from within the pilot's head box and the luminance cut-off at the fringes of view lacks sharpness. This is generally attributable to two undesirable properties known holographic diffusers. Firstly, as the light's angle of incidence on a holographic diffuser approaches the limits of acceptable angles of incidence consistent with its design, the hologram's diffusion properties begin to break down and the incident light begins to transmit through the hologram without becoming diffused or deviated in propagation angle. Secondly, the corresponding plot of display luminance as a function of viewing angle resembles a bell-shaped curve. This causes the viewed display images to become dim as viewing angles approach the edges of the viewing angle range. Further, considerable wasted light falls outside the useful range of viewing angles owing to lack of sharpness in luminance fall-off at the fringes of the viewing angle range of interest.

FIG. 1 is a side view of a conventional diffusion screen arrangement in the art. With reference to FIG. 1, a collimated, or partially collimated, white light input beam 10 illuminates a refractive medium substrate 12 and a holographic film diffuser 13 at normal incidence. The holographic film 13 diffuses the projected output beam 14 over angular range $\lambda$. The angle $\lambda$ shown in FIG. 2 is the halfpeak full width angle of the luminance angular distribution profile between halfpeaks 20. Little, or no, color dispersion is noticeable.

Referring to FIG. 1A, it is noteworthy that when a collimated, or partially collimated, white light input beam 10 is incident on refractive medium substrate 12 at an angle (p greater or less than 90°, the beam exiting the hologram can be designed to maintain the same (or nearly the same) diffusion angle, $\lambda$, as that for normal incidence. Alternatively, referring to FIG. 1B, with normal incidence of collimated, or partially collimated, white light input, an output beam with a diffusion angle, $\lambda$, can be projected in a direction that is not normal to the substrate. This can improve the luminance of an aircraft cockpit instrument display located below the pilot eye level, and with the instrument display face normal at a considerable (20° to 30° or more) angle to the pilot's direct view line. This can be accomplished by projecting the diffused output beam away from the instrument face normal and toward the center of the pilot's head box.

Also, designs of holographic diffusers are possible in which the input white light collimated, or partially collimated, beam and the propagation direction of the diffused output beam both deviate from the substrate (or instrument display face) normal.

In these prior art diffuser designs, the gradual luminance fall-off at the fringes of the viewing angle range (and at angles beyond those fringes) causes a waste of light resulting in reduced display luminance. Therefore, to minimize wasted light and maximize the light flux captured within the viewing angle range of interest, it is advantageous to maximize the slope at the halfpeak points of the luminance angular distribution curve.

In addition, for vehicle illumination applications, light beyond the pilot's headbox contributes to undesired reflections off of the windows, commonly referred to as canopy reflections, degrading night visibility. Therefore, a sharp cutoff in luminance outside the headbox minimizes the potential for this to occur.

SUMMARY OF THE INVENTION

This invention is particularly useful as a beam deflecting diffusion screen for displays, such as LCD instrument panel modules in aircraft cockpits and heads-up displays although its application is not limited to displays. A set of narrow superimposed deflected diffused beam profiles with sharp luminance cut-offs at their halfpeak full width points forms a composite angular luminance distribution. By concentrating these superimposed light beams that project from a display panel and by capturing them within the pilot's head box, efficiency is improved by minimizing the light wasted by projection outside the pilot's head box. Although an individual projected narrow beam angular profile does not, by itself, render the display luminance uniform as a function of viewing angle, the superposition of a plurality of individual narrow beams can be designed to generate uniform luminance over a wide viewing angle range of interest.

The invention is accomplished with the structure and method of the present invention by sending collimated, or partially collimated, light through a substrate with a film matrix comprising a nested plurality of individual joined geometrically shaped holographic cells. The cells comprising the matrix are subdivided into groups. Each cell within a group contains a uniquely patterned holographic diffuser which may advantageously be a surface holographic diffuser. This generates a diffused narrow light beam projected in a direction diverse from that projected by every other cell in the group. The superposition of the variously directed diffused narrow light beams projected from each cell group produces a combined resultant diffused wide light beam. The resultant light beam has a luminance angular distribution profile with sharply vertical slopes at its halfpeak points and a substantially flat and wide peak over a wide viewing angle range of interest.

The display luminance thus produced is uniform over a wide range of viewing angles that span the dimensions of pilot's head box. This range of angles is centered on a specific beam deflection angle that passes through, or in close proximity to, the midpoint of the pilot's head box. Thus the matrix of cells on the display produces a uniform luminance over the entire surface of that display and when viewed from any point within the pilot's head box. The resulting display luminance is substantially uniform over a wider range of viewing angles than is known in the art and the sharpness of the luminance fall-off at the angular distribution profile halfpeak points is greater than is known in the art.

In the preferred embodiment, a non-alternating, single image is also provided for both eyes rather than alternating a separate right eye image with a separate left eye image. However, by means of controllable switchable holograms, it is also possible to project time-sequential alternating different left and right eye images to generate a stereo effect. This embodiment is enabled by the sharp luminance fall-off at the edges of a beam projected at an observer thereby making it possible to place the edge of a projected beam between the right and left eyes. Accordingly the projected image is seen by only one eye without a significant illuminated area projection into the other eye. By dynamically scanning the projected beam back and forth to position the illuminated region of the projected beam first only on one eye and then on only the other eye, it is possible to display a dynamically varying stereo image. The stereo effect is generated by creating the appropriate different perspective view of a three dimensional scene for each eye.

It is necessary for the observer's head position to be accurately positioned to enable the beam edges to fall between the observer's eyes. Alternatively, a head position sensing device can feed the observer's eye positions back to the switchable hologram's scan control system so that the scan can be dynamically corrected to place the beam edges between the observer's eyes.

This invention is most useful for applications where collimated, or partially collimated, light is incident on a display and a need exists to project the light transmitted by the display into a wider and more diffuse beam. A further enhancement of its usefulness occurs when the projected diffuse beam is uniformly distributed over a desired wide range of viewing angles and with sharp luminance cut-offs at the edges of that range. The projected diffuse beam can also have an asymmetric output beam envelope (that is, one having different angular widths in various profile planes rotated at different angles about the output beam's propagation direction), and which has a high efficiency with little or no color dispersion. It may also be desired to have the option of deflecting the axis of this output beam envelope at a different angle from the input beam direction. An asymmetric output beam envelope and/or one having an axis different from that of the input beam is useful for minimizing light flux that fails to fall within a pilot head box having asymmetric dimensions and/or one that is positioned away from the display normal.

By creating a matrix of holographic cells arranged in a regular pattern on or within the surface of the diffusion screen, the adjacent cells of a subgroup of the matrix have different holographic designs each of which deflects the diffused beam projected therefrom in a different direction. The beam spread and deflection direction of each projected output beam can be controlled by means of each different subgroup cell holographic design. The superposition of diffused projected output beams thus produced generates a composite angular luminance distribution with sharp profile slopes at its halfpeak points and a substantially flat wide peak. The composite projected beam has the desired diffusion spread and propagation direction.

Thus, the present invention uses a method and apparatus for sending light beams from a display through a substrate matrix of nested individually joined geometrically shaped cells. The cells are divided into subgroups wherein each cell of a subgroup contains a patterned holographic diffuser with a different design or projection angle for optimal diffusion to occur. Each cell of a subgroup projects a diffused light beam with a different angle of propagation from that of the other cells of the subgroup.

Owing to the holographic diffuser's repetitive pattern of cell subgroups, there are many more cells than beam projection directions. Therefore each cell has a beam projection direction shared with many other cells in the matrix. The angular distribution of light incident on a holographic diffuser cell can be widened by the cell's diffusion properties. Thus the angular distribution of the beam projected from that cell can be wider than that of the incident light beam. Further, the beam projected from that cell can propagate in directions diverse from that of other cells of its cell subgroup.

Therefore the angular distribution of the composite beam projected from a subgroup of cells can be wider and, possibly more angularly asymmetric, than any of the individual component beams comprising the composite beam. Further, because the composite beam can be comprised of a plurality of individual beams having narrow angular distributions (compared with the composite beam's distribution), the angular distribution profile slope at the composite beam's halfpeak points can be sharp and nearly vertical, similar to that of the narrow beams. When the display is viewed from points within the pilot's head box, display luminance can be a uniform function of viewing angle because the peak composite projected beam's angular distribution is substantially flat over a wide range of viewing angles. Thus a predetermined beam spread and deflection angle is created in relation to the viewer. Photometric efficiency is maximized by virtue of high, nearly vertical, slope angles produced at the fringes of the luminance angular distribution profiles projected from cell subgroups across the display surface.

BRIEF DESCRIPTION OF DRAWINGS

Figure 1:
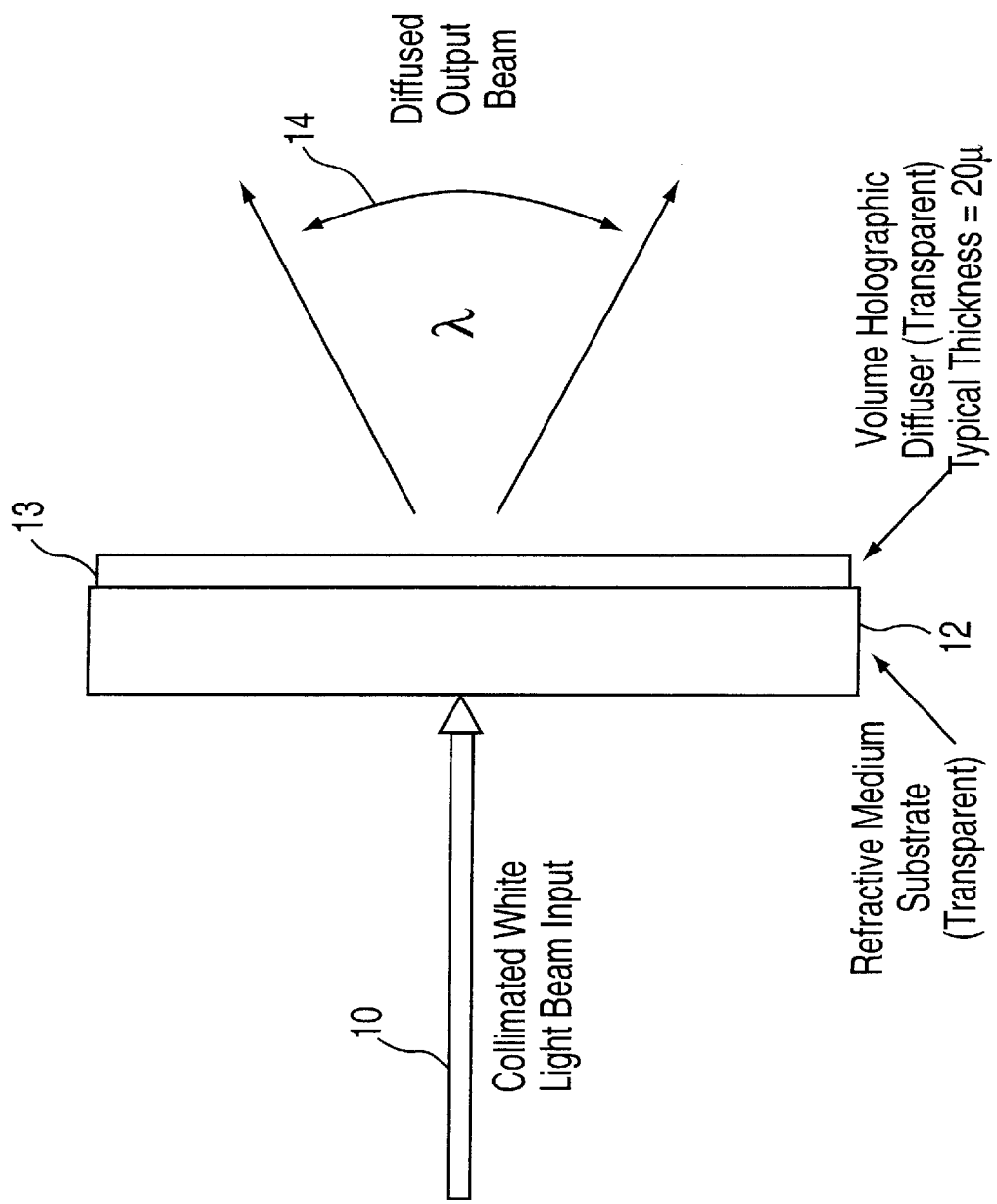

Brief Description of the Several Views of the Drawing

FIG. 1 is a side view of a prior art diffusion screen arrangement.

Figure 1A:
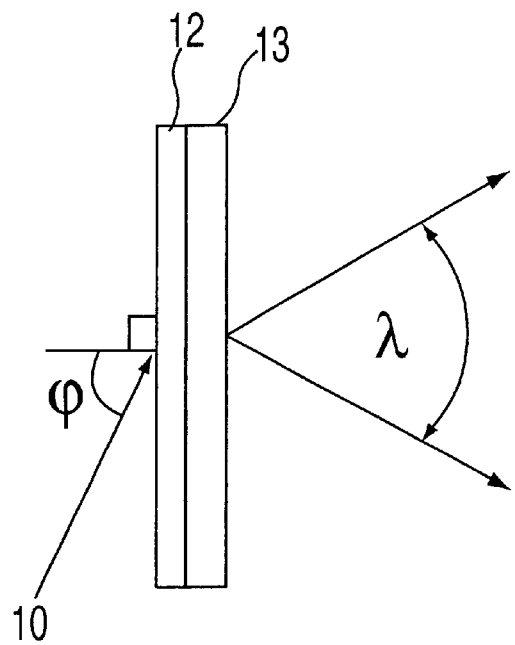

FIG. 1A is a side view of a prior art holographic diffuser wherein the incoming angle incidence of input light is not normal to the face of the holographic diffuser.

Figure 1B:
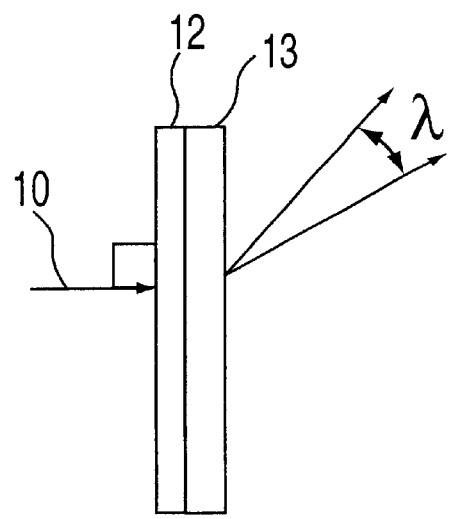

FIG. 1B is a side view of a prior art holographic diffuser wherein the outputted light is not normal to the surface of the holographic diffuser.

Figure 2:
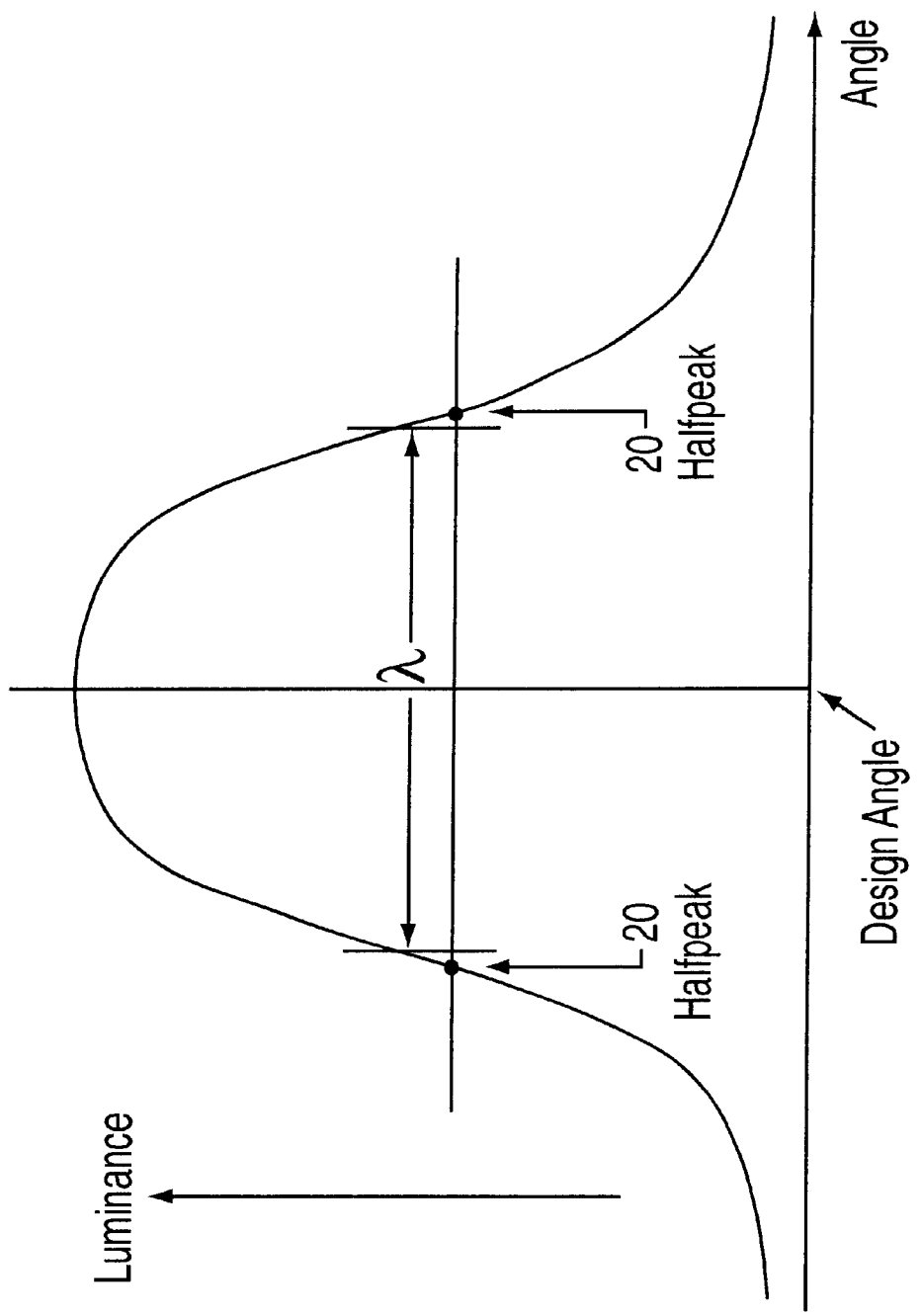

FIG. 2 is a profile plot in Cartesian coordinates showing the prior art bell curve function of luminance verses viewing angle for a specific projection angle.

Figure 3:
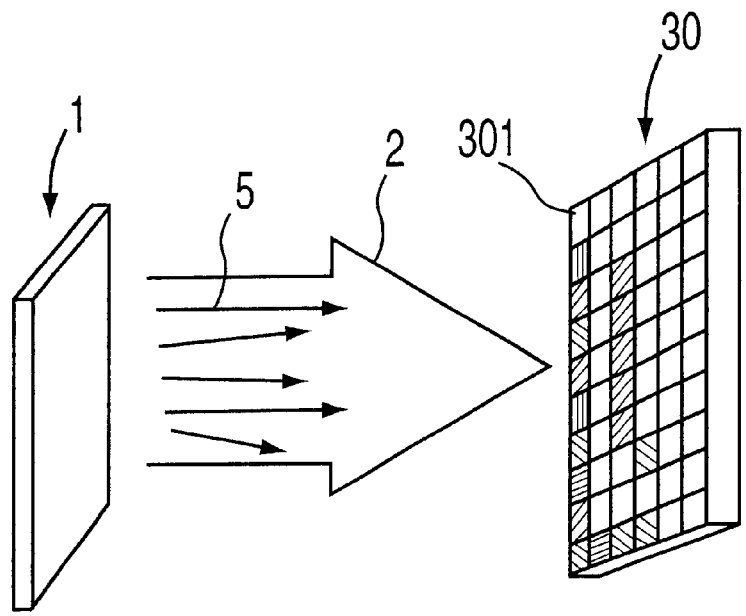

FIG. 3 is a perspective view of the input side of the holographic diffuser of the present invention.

Figure 4:
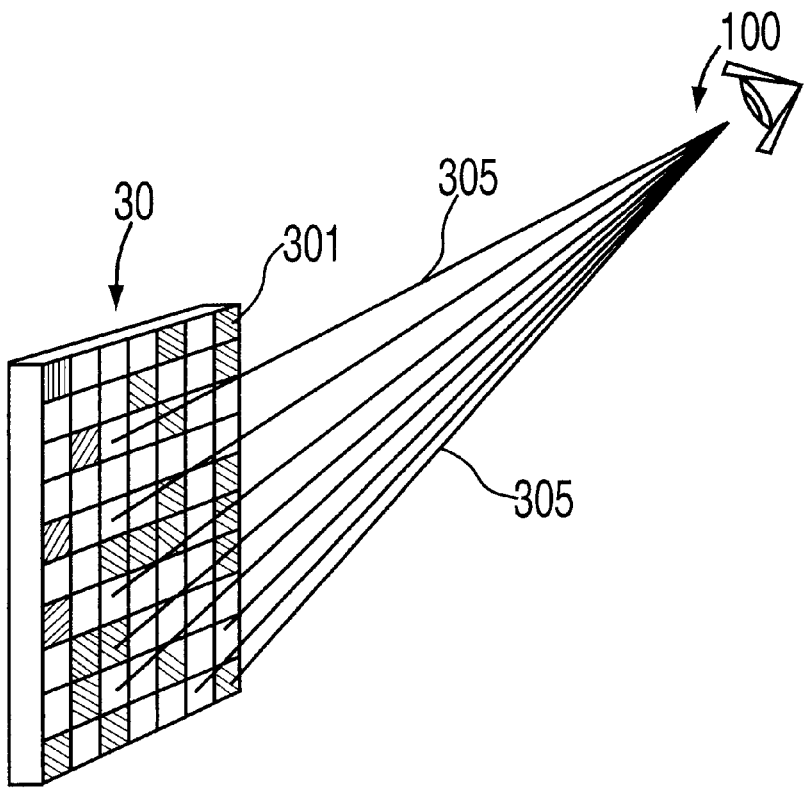

FIG. 4 is a perspective view of the output side of the holographic diffuser of the present invention.

Figure 5:
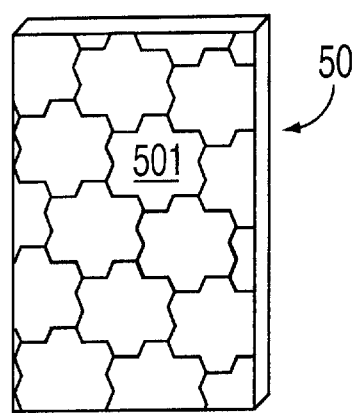

FIG. 5 is a perspective view of the holographic diffuser of the present invention wherein 18 sided cell subgroup shapes are used.

Figure 5A:
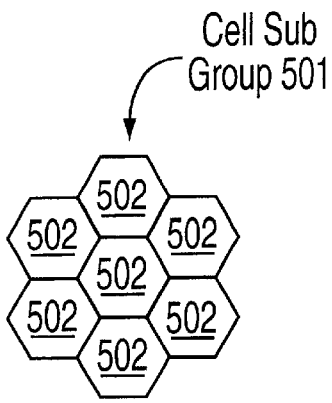

FIG. 5A depicts the nested holographic cells of a cell subgroup of FIG. 5.

Figure 6:
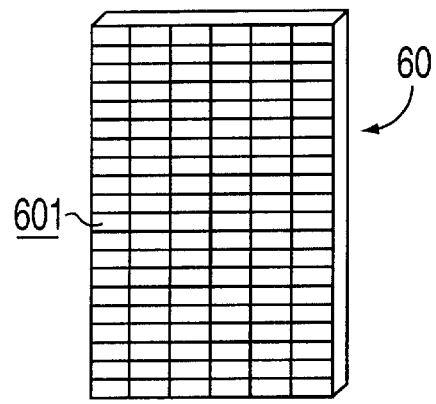

FIG. 6 is perspective view of the holographic diffuser of the present invention wherein rectangular holographic cell subgroup shapes are used.

Figure 6A:
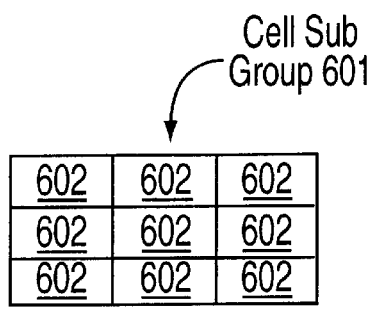

FIG. 6A depicts the nested holographic cells of a cell subgroup of FIG. 6.

Figure 7:
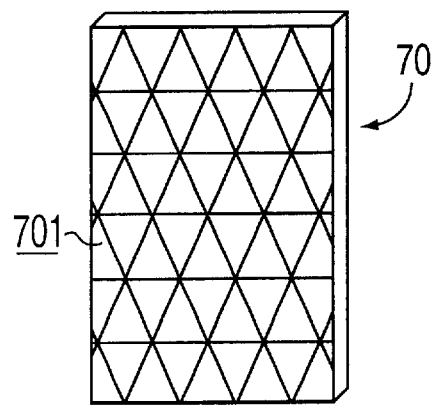

FIG. 7 is perspective view of the holographic diffuser of the present invention wherein triangular holographic cell subgroup shapes are used.

Figure 7A:
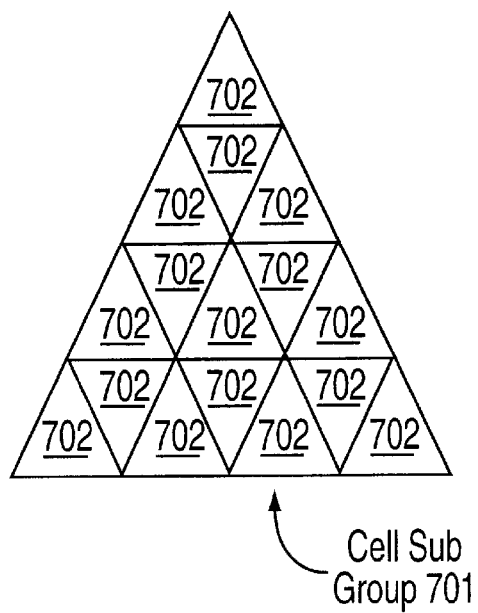

FIG. 7A depicts the nested holographic cells of a cell subgroup of FIG. 7.

Figure 8:
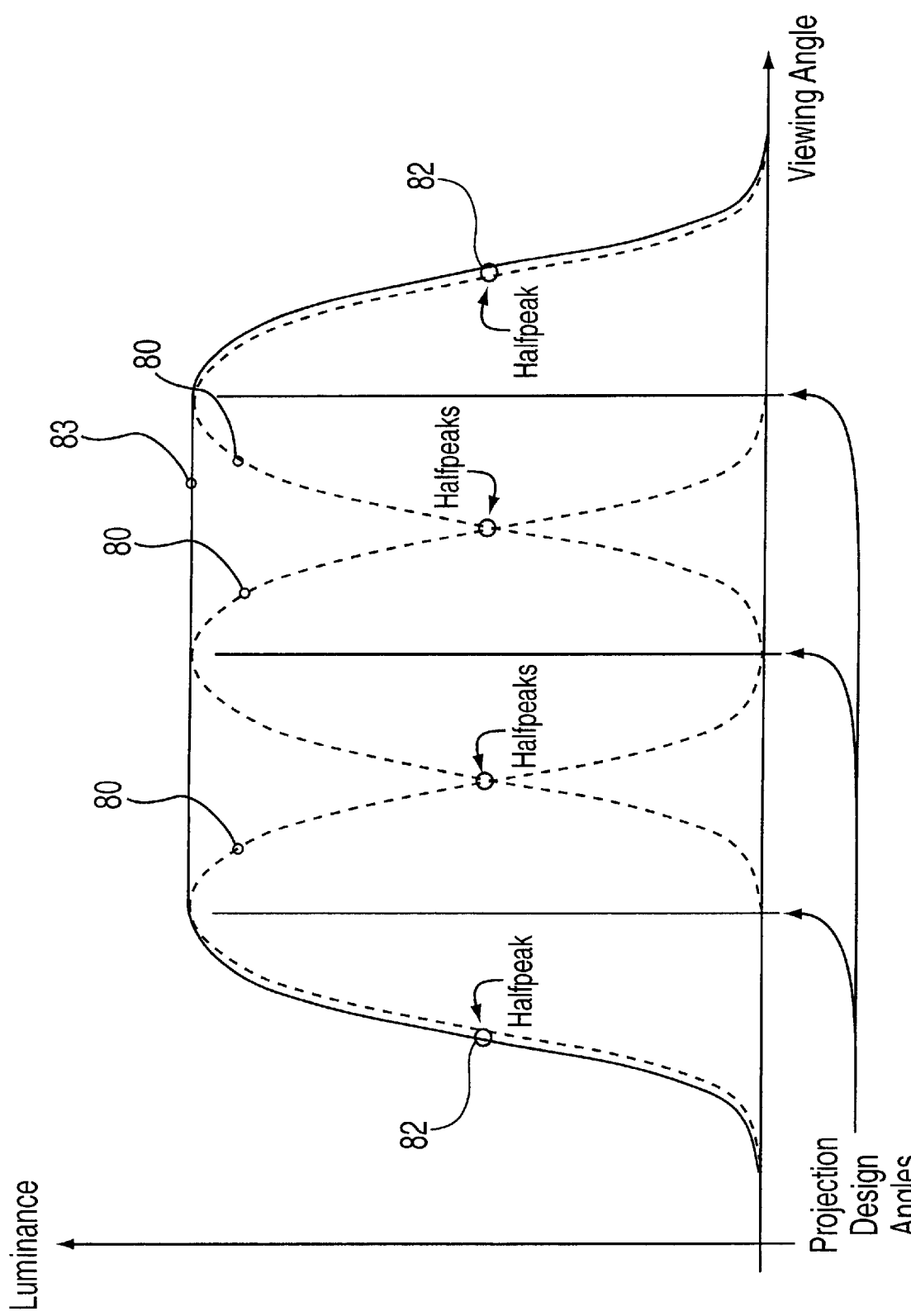

FIG. 8 is a graph in Cartesian coordinates of resultant luminance versus projection angle for three superimposed diffusion profiles of the present invention when partially collimated light is input to a holographic diffuser.

Figure 9:
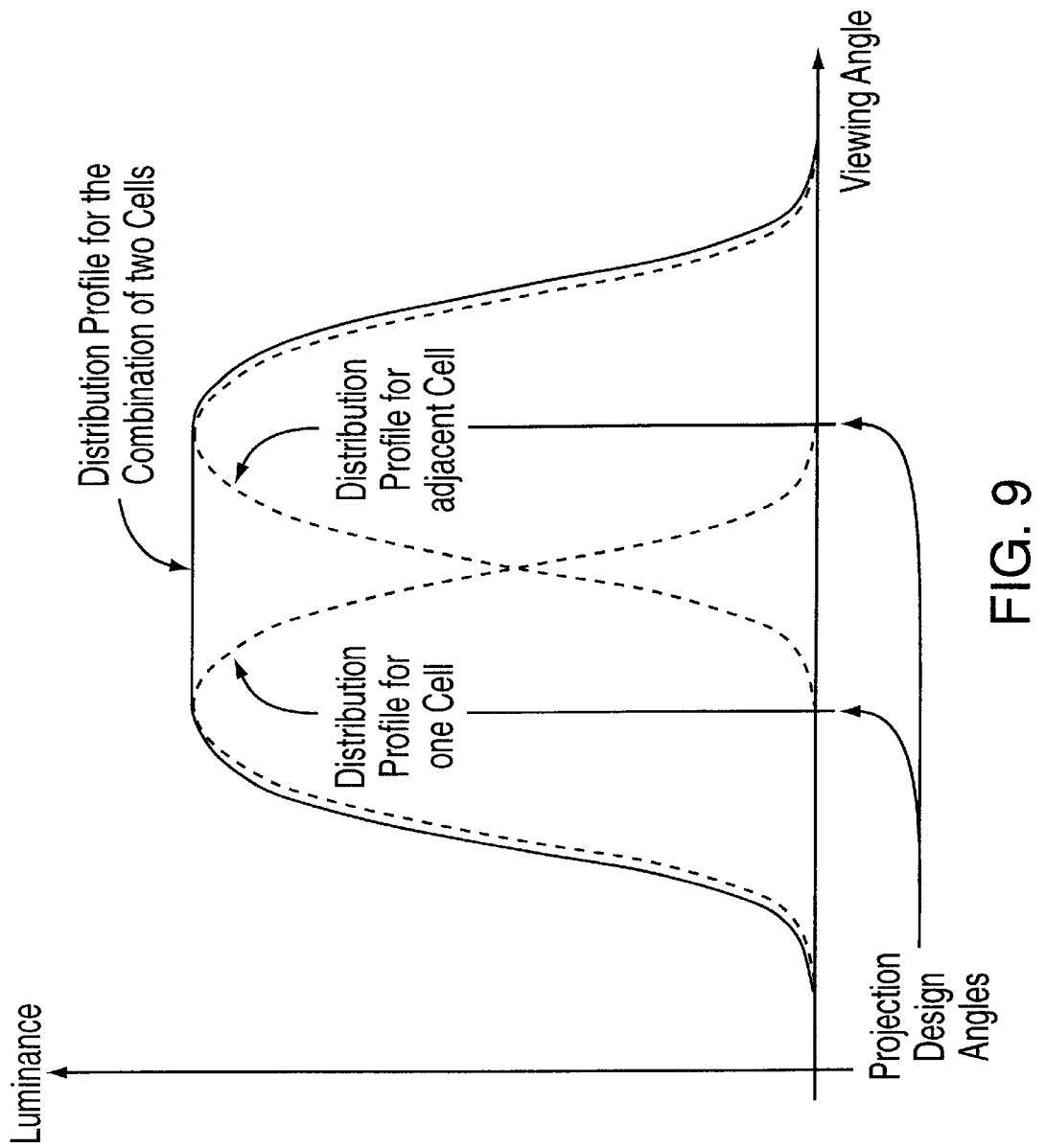

FIG. 9 is a graph in Cartesian coordinates of resultant luminance versus projection angle for two superimposed diffusion profiles of the present invention when partially collimated is input to a holographic diffuser.

Figure 10:
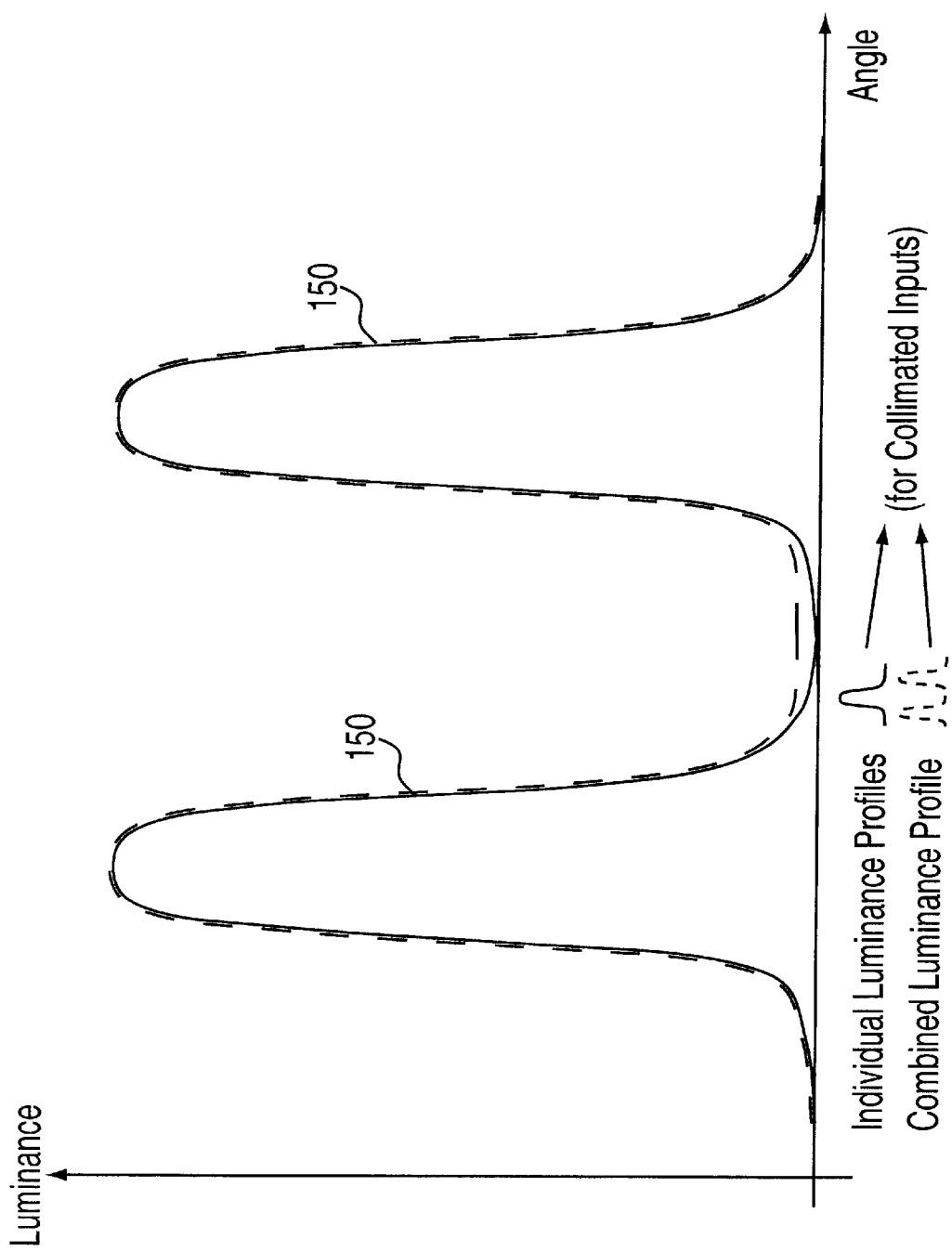

FIG. 10 is a graph in Cartesian coordinates of resultant luminance versus projection angle for two superimposed diffusion profiles of the present invention when collimated light is input to a holographic diffuser.

Figure 11:
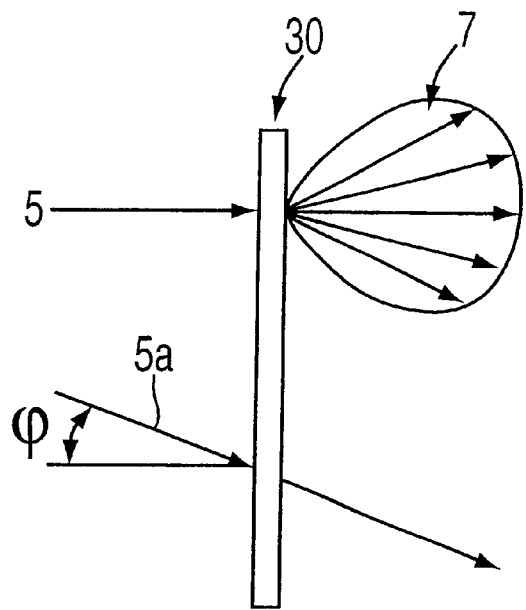

FIG. 11 is a side view of the first element of the second embodiment of the present invention.

Figure 12:
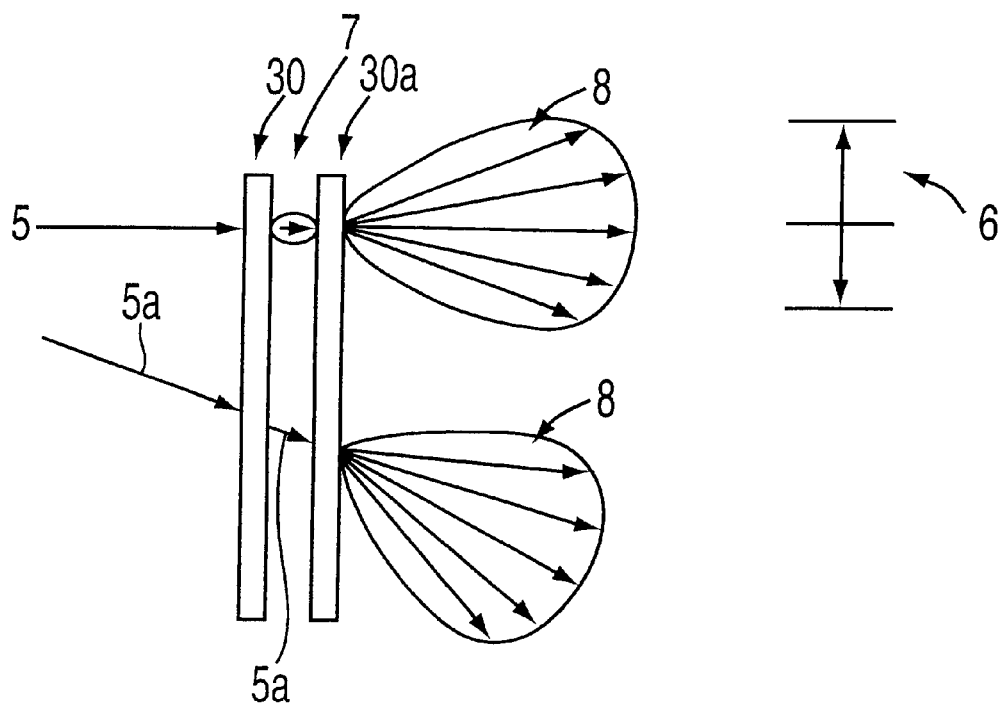

FIG. 12 is a side view of the complete second embodiment with both elements in place.

DETAILED DESCRIPTION OF THE INVENTION

Mode(s) for Carrying Out the Invention

FIGS. 3 and 4 show a holographic diffuser 30 in accordance with present invention. Referring to FIG. 3, the holographic diffuser 30 is made up of nested individual joined geometrically shaped cells that form a matrix of cells disposed across holographic diffuser 30. These cells are clustered in a contiguous arrangement of nested cell subgroups 301 that together form the patterned holographic diffuser 30. Each individual joined geometrically shaped cell of cell subgroup 301 comprises an individual patterned holographic diffuser element. Each holographic diffuser element of a cell subgroup diffuses the input light and projects the diffused beam in a direction unique from that projected by the other diffuser elements of its cell subgroup. A display 1, which may be typically a backlit LCD display is shown in FIG. 3. Incident light 2 comprised of light rays 5 having various directions of propagation from the display 1 are incident upon holographic diffuser 30.

It is noted that the distance between display 1 and holographic diffuser 30 is not drawn to scale, and in practice the closer the display is to the diffuser, the easier it is to produce a clear image without resolution loss. Therefore, it is preferred that holographic diffuser 30 be laminated or attached to display 1. If the holographic diffuser is a surface type, then the laminated surface should not be the hologram surface. Instead, the hologram surface should face the display with a minimal air gap in order to minimize resolution degradation.

In order to prevent resolution loss by the holographic view screen 30, the size of the subgroup 301 of holographic cells must be smaller than a display pixel. As a rule of thumb, a subgroup dimension should not exceed half the corresponding pixel dimension. Thus ,the area of the subgroup should not exceed one fourth (¼) the area of a display pixel.

Further, those skilled in the art will realize that edge effects at the boundary between adjacent holographic cells may prevent the desirable abrupt "step function" change of holographic properties in the transition region between cells. Therefore, a loss of holographic performance occurs in the boundary area between two cells. This loss is more pronounced for smaller holographic cells owing to the greater percentage of the cell area occupied by the transition region between smaller cells. Accordingly, the area of the holographic cells comprising a subgroup 301 should be made no smaller than required to prevent resolution loss.

In FIG. 3, partially collimated light 2 incident on holographic diffuser 30 passes through its multiple cell structure. Each individual nested holographic element of this structure diffuses the light it intercepts and projects it toward some portion of the pilot's head box. Each cell comprising a cell subgroup 301 projects its diffuse beam in a direction diverse from the other cells of that subgroup. The superposition of all these diversely projected beams form a composite beam that can be viewed from all points within the pilot's head box. The luminance versus viewing angle plot of FIG. 8 is an example of the luminance of a subgroup of cells as a function of viewing angle for observation points within the pilot's head box. Note that FIG. 8 is a profile plot taken through a three-dimensional plot representing two orthogonal angular dimensions (representing directions of light flux propagation passing through the area of the pilot's head box) and the luminance dimension.

Accordingly, there could be a three-by-three array of diffused beams projected at different projection design angles from a subgroup of nine holographic cells. The plot of FIG. 8 could be a profile slice taken through three of the nine projected beams. The three dashed line plots 80 of FIG. 8 represent luminance angular profiles of individual projected beams, each centered on its unique projection design angle. The solid line 83 represents the composite sum of the individual projected beam luminance angular distributions 80.

Note that each beam plot crosses the adjacent beam plot at the common half peak point of both beams. This condition, necessary to produce a uniform luminance function of viewing angle, is implemented by selecting the angular separation of projection design angles of the individual beams to be equal to the angular separation of their half peak points.

The profile plot of a three-by-three arrangement of diffused beams illustrated by FIG. 8 is one of many possible arrangements. FIG. 9 is an example of a profile plot through the center of a pair of projected beams that could be in a one-by-two, a two-by-two, a three-by-two, or any N-by-two arrangement of beams projected from a holographic diffuser's cell subgroup 301. Of course, there are also many other possible arrangements, such as three-by-four, three-by-five, four-by-four, or in general, N-by-M, where the N and M variables could be any integer value within reason.

A portion of the diffused beams 305 meet at a location 100 (shown in FIG. 4 as the eye location of the viewer) which is within a designated spatial region such as a pilot's head box. These portions of diffused beams are individual viewing angles from the eye location 100 to each of a plurality of cell subgroups 301 on the holographic diffuser 30. At location 100, the diffused beam portions projected along viewing angles 305 are superimposed.

The superimposed beam portions are shown graphically as an output angular distribution profile curve in FIG. 8 by curves 80 that, added together, form the desired curve 83. By virtue of the uniform luminance over the wide range of viewing angles in FIG. 8, the display luminance for viewing angles 305, which are within that uniform luminance angular range, is also uniform. Accordingly, the luminance of the display is optimized at viewing location 100. Additionally, the wasted light outside the viewing angle region of interest of a traditional holographic diffuser is overcome by curve 83, which has a nearly vertical slope at halfpeak points 82.

This improvement is illustrated by comparing FIG. 8 with FIG. 2. In the present invention, it is readily seen from FIG. 8 that the luminance in the vicinity of the halfpeak points increases or decreases in a very sharp fashion. This is in contrast to the prior art FIG. 2 wherein the luminance is more of a bell curve shaped function having a relatively small angular region of uniform luminance and a more gradual variation of luminance in the angular vicinity of the halfpeak points. The resulting wasted light flux is undesirable in a display because it reduces the angular viewing range of adequate luminance. This phenomenon is generally referred to in the art as "the low slope problem at the halfpeak point".

Referring again to FIGS. 3 and 4, the adjacent nested holographic cell subgroups 301 can be implemented in an endless variety of nested geometric shapes. Three examples of these are illustrated in FIGS. 5, 6, and 7. FIG. 5 illustrates a holographic diffuser 50 comprised of a nested matrix of 18-sided polygonal cell subgroups 501. FIG. 6 illustrates a holographic diffuser 60 comprising a nested matrix of rectangular cell subgroups 601. FIG. 7 illustrates a holographic diffuser 70 comprising a nested matrix of triangular cell subgroups 701.

Each of these subgroup shapes is filled with a nested matrix of holographic cells. Examples of these are illustrated in FIGS. 5A, 6A, and 7A. FIG. 5A shows how seven nested hexagonal holographic cells 502 can fill cell subgroup 501. FIG. 6A shows how nine nested rectangular holographic cells 602 can fill rectangular cell subgroup 601. FIG. 7A shows how sixteen nested triangular holographic cells 702 can fill triangular cell subgroup 701.

Each different geometric shape has as its own holographic light distribution properties which contribute to the goal of widening the resultant diffused beam in an angularly uniform luminance distribution and with minimum waste outside the angular region of interest to enable the invention.

Nesting of the cell subgroups and of the cells comprising them is advantageous because gaps between subgroups, or between the cells that comprise them, would create void areas having no holographic diffusion properties. Light leakage through said void areas would cause either light losses or unwanted non-uniform display luminance owing to nonuniform diffusion properties.

The holographic properties of cell subgroups and the cells that comprise them differ. The holographic properties of each cell subgroup are identical to those of every other cell subgroup of the holographic diffuser. This ensures identical diffusion characteristics for the composite beam projected from each cell subgroup. The holographic properties of the holographic cells comprising each cell subgroup differ from each other. This is necessary for increasing the prior art diffusion angle 14 defined in FIGS. 1, 1A, and 1B. In addition, as previously described, this is necessary for obtaining luminance uniformity over the design range of viewing angles.

FIG. 10 is an example of the combined luminance angular profile obtained when collimated light is input for a hologram diffusion screen designed for partially collimated light, such as that for which the luminance angular profile is illustrated in FIG. 9. The distribution cells in FIG. 9 have design angles differing by an amount that causes the two luminance angular profiles cross at a common luminance half peak point. This ensures that the luminance angular distribution profile for the combination, or superposition, of the two luminance distribution profiles projected from the two cells is nearly uniform between the two holographic cell design angles.

However, when the two cells are illuminated by more collimated light than that for which their design angles were configured, the resulting distribution profiles 150 illustrated in FIG. 10 will be narrower than those of FIG. 9. Accordingly, the individual luminance profiles 150 of FIG. 10 fail to cross at a common half peak point thereby generating a combined luminance profile with a deep luminance valley between the two luminance profiles 150. The resulting luminance angular non-uniformity in FIG. 10 can be remedied by redesigning the holographic diffuser to have a sufficiently small angular separation between the projection design angles of the two cells to make its two individual luminance profiles cross at a common half peak point. In this way it is possible also to decrease wasted light and to maintain luminance uniformity for collimated, or nearly collimated light input. This will produce uniform display luminance over a larger angular viewing range in comparison to the prior art which fails to use a multiplicity of individually joined geometrically shaped cell subgroups 301 or a superposition of the diffused outputs beams of such cell subgroups.

Specifically, again referring to FIGS. 3 and 4, and as noted above, the present invention creates a holographic diffuser 30 that has a pattern of holographic cell subgroups 301 distributed over the face of the diffuser and/or within the substrate. If the nested adjacent cells within each cell subgroup 301 have different holographic diffuser designs, then a collimated or partially collimated white (or monochrome) light beam input can generate a superposition of two or more diffuser output beam angular distributions (see FIG. 8 and FIG. 9). This is accomplished by generating output diffusion beams in at least two different directions.

The present invention is therefore able to function with both collimated and partially collimated light because each cell produces a superimposed resultant image at viewing location 100 resultant from a sum of diffused beams at projected at different angles. This results in the composite output distribution 83 of FIG. 8 from its components of narrow output distributions 80. This also makes it possible to redirect diffused light beams to fill a viewing angle range of interest when the incident light 5 is normal to the diffuser 30 as shown in FIG. 1B or when it is not normal to the diffuser 30 as shown in FIG. 1A.

It is known in the art that backlighting an LCD display with collimated or partially collimated light considerably improves the contrast of said display. However, the greater the backlight collimation, the more difficult it becomes for current art diffusion screens to illuminate a wide range of viewing angles uniformly and efficiently (without significant wasted light flux). This invention utilizes collimated, or partially collimated, backlighting to enable the simultaneous improvement of display contrast, uniformity, and efficiency over that provided by current art view screens for a wide range of viewing angles.

Thus overall, the invention improves angular uniformity, which is the luminance uniformity of any cell subgroup in the matrix as a function of viewing angle.

A second embodiment of the present invention uses two or more holographic diffusers to diffuse passed light that was not diffused in a first pass through a first holographic diffuser as discussed in detail below.

Another property of holographic diffusers is the tendency to become transparent, i.e., to become non-diffusing transmitters, when the incident beam direction differs sufficiently from its design projection angle. This property is illustrated by FIG. 11. In particular, referring to FIG. 11, incident beam 5 is diffused by the diffuser 30 to create diffused beam 7. Beam 5a is incident at an angle relative to the projection angle, and as discussed above, beam 5a is transmitted without being diffused by the diffuser. It is also noted that input beams 5 and 5a are spatially separated for illustration purposes. The beams should, in practice be superimposed on the same area or across the entire substrate 30.

However, as shown in FIG. 12, in order to eliminate the non-diffuse transmitting property of beam 5a incident at an angle relative to the projection angle, a second holographic diffuser 30 can be added to the first. The second added holographic diffuser 30a can be air-spaced from the first holographic diffuser 30. Preferably, it would be laminated to the first holographic diffuser 30, for example, should volume holograms be employed. This would inhibit Fresnel reflection losses. In addition, any multilayer diffuser approach must be mindful of the resolution losses that would result from an increasing gap between the display and the diffusion screen.

Referring back to FIG. 12, the second holographic diffuser 30a would also transmit most parts of the diffusion profiles due to the first beam 5. The parts of the first beam's diffusion profile, which are closely aligned with the second beam's angle of incidence, would undergo a second stage of diffusion. Also, the designs of both holograms would depend on whether or not the interfaces between them are laminated or air-spaced.

Further, more than two holographic diffuser layers, may be used to accommodate an even larger range of input beams angles to be diffused. Also, the axes of symmetry of the diffusion profiles need not be designed to be parallel to the corresponding input beams.

Note that, unlike holograms of the volume type, surface holograms require a refractive index difference for the two media adjacent to the holographic surface. The surface hologram design must be tuned to that index difference. The magnitude of the scatter from a given surface hologram feature increases with larger index transitions across the surface. Accordingly, the scatter magnitude is greater when the hologram surface is bounded by air or vacuum than when it is bounded by a laminate. If the laminate index equals that of the surface hologram medium, then the scatter properties of the surface hologram are nullified.

It is also possible to generate different surface hologram patterns on each face of a sheet of surface hologram medium thereby making it possible to eliminate half of the above mentioned holographic diffusion layers. Again, it is advantageous to have a small airspace between layers and between the display surface and the adjacent surface hologram to maximize the scatter magnitude of the hologram.

Surface holograms can be recorded by any of the various means known in the art. For high volume production applications, it is most economical to emboss the holographic patterns from a master. It is known in the art to computer-generate holographic recordings of both the volume and surface type.

Other embodiments of this invention implement controllable switchable holograms as described in U.S. Pat. No. 6,115,152 issued on Sep. 5, 2000 and in U.S. Pat. No. 6,317,228 issued on Nov. 13, 2001, both by inventors Popovich, et al. These patents are hereby incorporated by reference in their entirety to the extent that no conflicts exist. A controllable switchable hologram, described as an "electrically switchable holographic optical element (ESHOE)" in U.S. Pat. No. 6,317,228, can be fabricated in reflective or transmissive form. One or more specially designed ESHOEs can:

project images that change, move, vary in size, and/or vary in color;

project spots that dynamically move, vary in size, and/or vary in color;

combine light from multiple different collimation sources into a single projected beam by using multiple ESHOEs;

homogenize a beam that can dynamically vary in divergence, propagation direction, and/or color; and vary the intensity of (or dim) the propagated light in each of the above applications or as a stand alone attenuator element.

Implementation of light diffusion techniques defined herein, in combination with ESHOEs, can make illumination or irradiation objects generated by the latter have spatially more uniform and with more sharply defined illumination or irradiation edge boundaries thereby increasing the efficiency and the uniformity of light distribution within these objects. Use of ESHOEs in combination with the herein defined diffusion techniques adds the possibility of dynamically changing holograms that can generate dynamic variations in color, size (or scale), divergence, and/or propagation direction (or angular movement). The latter finds application in scanning systems and for generating movement and a dynamically varying illumination of an object or multiple objects in a display.

A diffuser in accordance with this invention can be implemented by a surface hologram, a volume hologram, or a controllable switching hologram. Further, this invention can be utilized not only with visible light but can also be applied to diffusers having operational wavelength ranges that include non-visible parts of the electromagnetic spectrum, such as the ultraviolet (UV) or infrared (IR) region. Such embodiments require a light-sensing device so that a human observer may observe a display by means of a device that converts invisible light to visible light. For example, a pilot wearing night vision goggles can read a display that emits in the IR spectral region, which would be invisible without the goggles. Such a display could have holographic elements and a light source designed to operate in the IR.

The invention described herein can apply to both monochromatic and polychromatic applications, which may exist within both the visible and non-visible portions of the electromagnetic spectrum. The effects of polarization can be especially useful for devices whose operation is based on polarized light; for example in the case of liquid crystal displays or polarization maintaining fiber optic based communication systems.

Alternate embodiments may be devised without departing from the spirit or the scope of the invention.

What is claimed is:

1. A method of diffusing light for a display comprising the steps of:
   sending a group of collimated or partially collimated light beams through a substrate matrix of a plurality of nested individual joined geometrically shaped cells wherein each of the cells contains a patterned holographic diffuser with a set projection angle;
   producing from each of the cells a transmitted diffused light beam with a narrow angular luminance distribution profile curve with sharply vertical profile slopes at halfpeak points; and
   superimposing each transmitted diffused light beam from each of the cells to produce a combined resultant diffused light beam having an angular luminance distribution profile curve with sharply vertical profile slopes at halfpeak points and with a substantially flat and wide peak to produce a uniform resultant luminance over a wide range of view angles with a predetermined beam spread and beam deflection angle in relation to a predetermined location of view of the combined resultant diffused light beam.

2. The method of claim 1 wherein each of said cells contains a patterned surface holographic diffuser.

3. The method of claim 1 wherein each of said cells contains a controllable switchable hologram.

4. The method of claim 1 wherein said wide range of view angles has different angular widths in various profile planes rotated at different angles about the combined resultant diffused light beam's propagation direction.

5. The method of claim 1 wherein said light includes wavelengths that are within non-visible parts of the electromagnetic spectrum.

6. That method of claim 1 wherein said light has an operational wavelength range that is monochromatic.

7. That method of claim 1 wherein said light has an operational wavelength range that is polychromatic.

8. The method of claim 1 wherein the step of sending the group of collimated or partially collimated light beams through the substrate matrix further comprises sending each of said light beams at an angle of incidence which is not normal to an input surface of said substrate matrix.

9. The method of claim 1 wherein the step of superimposing each transmitted diffused light beam from each of the cells further comprises projecting said combined resultant diffused light beam at an angle of view which is not normal to the input surface of said substrate matrix.

10. The method of claim 1 wherein the step of sending the group of collimated or partially collimated light beams through a substrate matrix further comprises:
    sending each of said light beams at an angle of incidence which is not normal to an input surface of the substrate matrix.

11. The method of claim 1 wherein the step of superimposing each transmitted diffused light beam further comprises:
    producing a combined resultant diffused light beam at an angle of view which is not normal to the input surface of the substrate matrix of cells.

12. The method of claim 1 wherein each of said nested individual joined geometrically shaped cells is square in shape.

13. The method of claim 1 wherein each of said nested individual joined geometrically shaped cells is rectangular in shape.

14. The method of claim 1 wherein each of said nested individual joined geometrically shaped cells is triangular in shape.

15. The method of claim 1 wherein each of said nested individual joined geometrically shaped cells is hexagonal in shape.

16. The method of claim 1 wherein each of said nested individual joined geometrically shaped cells is polygonal in shape.

17. The method of claim 1 further comprising the steps of:
    providing an additional substrate matrix having patterned individual joined geometrically shaped cells of holographic diffusers with set projection angles structured for forming a combined resultant diffused light beam with an angular luminance distribution profile curve with sharply vertical profile shapes and with a substantially flat and wide peak to produce a uniform resultant luminance over a wide range of view with a predetermined beam spread and beam deflection angle;
    locating the additional substrate matrix parallel to said first mentioned substrate matrix; and
    diffusing non-diffused light from said first mentioned matrix through the additional substrate matrix.

18. A holographic diffuser comprising:
    a matrix within a substrate having patterned nested individual joined geometrically shaped cells of holographic diffusers structured for forming a combined superimposed resultant diffused light beam with an angular luminance distribution profile curve with sharply vertical profile shapes and with a substantially flat and wide peak to produce a uniform resultant luminance over a wide range of view with a predetermined beam spread and beam deflection angle in relation to a location of view of the combined resultant diffused light beam.

19. The diffuser of claim 18 wherein said shaped cells of holographics diffusers comprise surface holographic diffusers.

20. The diffuser of claim 18 wherein shaped cells of holographic diffusers comprise switchable holograms.

21. The diffuser of claim 18 wherein said matrix has at least one holographic diffuser which receives and diffuses at least one non-collimated light beam.

22. The diffuser of claim 18 wherein each of said nested individual joined geometrically shaped cells is polygonal in shape.

23. The diffuser of claim 18 wherein each of said nested individual joined geometrically shaped cells is square in shape.

24. The diffuser of claim 18 wherein each of said nested individual joined geometrically shaped cells is triangular in shape.

25. The diffuser of claim 18 wherein each of said nested individual joined geometrically shaped cells is rectangular in shape.

26. The diffuser of claim 18 wherein each of said nested individual geometrically shaped cells is hexagonal in shape.

27. The diffuser of claim 18 further comprising:

an additional matrix having patterned nested individual joined geometrically shaped cells of holographic diffusers structured for forming a combined resultant diffused light beam with an angular luminance distribution profile curve with sharply vertical profile shapes and with a substantially flat and wide peak to produce a uniform resultant luminance over a wide range of view with a predetermined beam spread and beam deflection angle in relation to a location of view of the combined resultant diffused light beam; and said additional matrix being located parallel to said first mentioned matrix and wherein non-diffused light from said first mentioned matrix is diffused by said additional matrix.

28. The holographic diffuser of claims 18 wherein said individual joined geometrically shaped cells of holographic diffusers are arranged in nested subgroups.

29. A holographic diffuser for a display having individual cells comprising display pixels, said diffuser individual cells being clustered in a contiguous arrangement of nested cell subgroups, the size of each said subgroup being smaller than a display pixel.

30. The holographic diffuser of claims 29 wherein said diffuser is directly attached to said display.

* * * * *